United States Patent
McGrath et al.

(10) Patent No.: US 7,672,483 B2
(45) Date of Patent: Mar. 2, 2010

(54) CONTROLLING AND CUSTOMIZING ACCESS TO SPATIAL INFORMATION

(75) Inventors: Timothy S. McGrath, Redmond, WA (US); Leonard Smith, Jr., Seattle, WA (US); David P. Horne, Redmond, WA (US); Duncan M. Lawler, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 11/393,442

(22) Filed: Mar. 30, 2006

(65) Prior Publication Data

US 2007/0258623 A1    Nov. 8, 2007

(51) Int. Cl.
*G06K 9/00* (2006.01)

(52) U.S. Cl. ................................... 382/103; 382/104

(58) Field of Classification Search ................. 382/103, 382/104
See application file for complete search history.

(56) References Cited

U.S. PATENT DOCUMENTS

2004/0139330 A1 *   7/2004   Baar .......................... 713/182

* cited by examiner

*Primary Examiner*—Tom Y Lu
(74) *Attorney, Agent, or Firm*—Shook Hardy & Bacon

(57) ABSTRACT

A spatial data handling and map generation system comprises a receiver component that receives a request for information associated with a geographic region and data associated with an initiator of the request. A mapping component renders a representation of the geographic region, the representation is customized according to a role assigned to the initiator of the request, the role is assigned based at least in part upon the received data.

18 Claims, 16 Drawing Sheets

CONTROLLING AND CUSTOMIZING ACCESS TO SPATIAL INFORMATION

BACKGROUND

Advancements in computing technology have enabled computers to transition from high-cost, low function devices to low cost machines that can perform a myriad of tasks. For example, today's consumer-level computing devices typically are packaged with an operating system that enables word processing applications, multimedia applications, network browsing applications, and the like to be employed by owners/users of the devices. This advanced functionality is no longer solely associated with immobile desktop computers. Rather, portable devices, such as portable telephones, personal digital assistants, instant messaging devices, and the like are currently capable of playing video, music, composing documents, composing and sending emails, and the like. Furthermore, both personal computers and portable devices typically include and/or are associated with graphical user interfaces that allow images to be viewed with increasing clarity. For example, many portable phones are equipped with digital cameras, and images can be viewed on screens of the portable phones. The images can also be delivered (e.g., over a cellular network) to another phone or device for display, retention, and/or transmission to yet another device.

Robust displays, enhanced networking, satellite images, increased storage capacity, and other related technology has enabled robust maps to be provided to desktop computers and portable devices. For example, a user can access a mapping website through entering a URL in a field of a web browser. Additionally, mapping applications can now be run from a computer, where the application connects to a server associated with the mapping application to provide a user with mapping data. Initially, these mapping applications included graphical representations of roadways and some monuments, thereby enabling users of the applications to quickly review a road system of a particular region. Mapping applications also often include route planning applications, wherein a user can provide a point of beginning and a point of destination of a journey and the route planning application can determine a route of travel between the two provided points.

As aerial imagery, satellite imagery, oblique aerial imagery and street-side imagery have become associated with traditional mapping for higher resolution visualization of a place, the mapping applications have evolved to enable display of those digital images of a region. For instance, a user can provide a mapping application with an address of a house, and a satellite image of a region surrounding such house can be returned to the user. The user can then alter zoom levels to review the house more closely or to gain additional context associated with the house (e.g., location of a highway with respect to the house). The images provided to users are becoming increasingly clear as aerial and satellite equipment is updated, such that users can review details such as location of fence lines, type of roof, and the like.

These digital and/or graphical representations are not solely limited to houses, as businesses, government buildings, and the like can be photographed with high resolution by a variety of satellites, aerial, or ground acquisition techniques. Moreover, computer-generated graphics can be employed to supplement (or take place of) these images, thereby enabling provision of details such as location of particular offices, alarms, and the like. The general public, however, need not have access to sensitive data (such as location of a safe within a business).

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Mapping and spatial information systems on computers can provide users with a significant amount of information with respect to a particular geographic region, including road names, elevation statistics, building names/sizes, lot sizes, and various other information that may be of interest to a user. Mapping and spatial information systems are intended to encompass scenarios such as interior space scenarios, business spatial visualization scenarios (e.g., a two dimensional shelf layout), etc. Given such a vast amount of information, however, one can discern that sensitive information can inadvertently be provided to individuals who desire to employ such information for criminal/unethical purposes. Similarly, an individual can easily become flooded with superfluous information that may confuse the individual and obfuscate data that is pertinent to such individual. The claimed subject matter relates to analyzing spatial data and selectively determining a manner of display of such data based at least in part upon a user's role. Therefore, sensitive information, such as security system data, floor plans of particular buildings (e.g., banks, government buildings, . . . ), utility information, particular building exits, amount of descriptive text, and the like can be selectively masked or provided depending upon a role assigned to the user. The role can conform to roles within a business, for instance. Rules of access and usage of provided spatial information can also then be defined by role.

Pursuant to an example, a user can request generation of a map of a particular geographic region. Along with the request, the user can provide information that can be employed to verify identity of the user, such as a username, password, personal identification number, biometric indicia, and the like. Furthermore, data associated with the device, such as a unique identifier, can be provided together with the request. Once the user's identity is verified, the user can be assigned a particular role. For instance, a list of authorized users and associated roles can be accessed once the user's identity is verified, and the user can be assigned the appropriate role. Thereafter, a map can be generated based at least in part upon the role associated with the user. Such approach can aid in providing only pertinent information to a user as well as ensuring that unauthorized users will not be provided with sensitive data.

Moreover, customized spatial information can be provided based at least in part upon a combination of a user's role and their location when requesting spatial data. For example, a store manager may desirably be provided with certain visual data relating to their store when they are within the store but may not be desirably provided the same information when they are outside the store. GPS receivers, triangulation, and the like can be employed in connection with determining a user's location.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
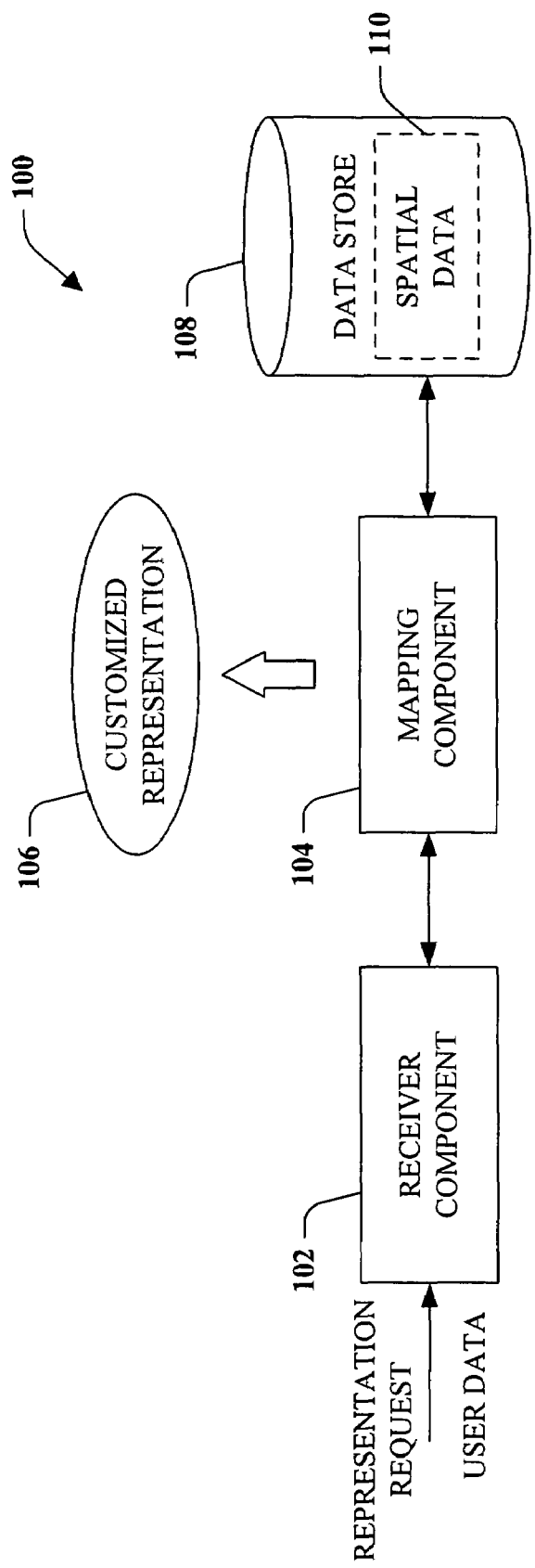
FIG. 1 is a high-level block diagram of a system that generates representations of spatial regions according to a role of individuals requesting the representations.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Referring now to FIG. 1, a system 100 that can selectively filter data or aggregate data with respect to spatial information based at least in part upon user role is illustrated. While the following description often refers to generating customized maps, it is understood that other representations of spatial regions can be rendered based at least in part upon user role and/or location. For instance, text describing a spatial region, audio signals, flashing lights or other visual data, and the like can be provided to a user based at least in part upon user role and/or location. It is understood that the appended claims encompass all such representations of spatial regions. The system 100 includes a receiver component 102 that receives a request for representation (e.g., a map) of a particular geographic region from a user. For example, the user can request a map of an address, a particular building, a portion of a building, or any other suitable geographic or spatial location/entity. The receiver component 102 can also receive data relating to the user, such as the user's location, the user's role, etc. Roles can be defined globally if the system 100 is available for use by the general public and/or specifically if used by a particular business or entity.

Pursuant to an example, a role can be provided for government employees with high-security access and a role can be provided for a general citizen. These roles can be employed to determine which individuals are allowed access to data that may be sensitive. For instance, an individual in the general public need not be provided with information relating to emergency exits in a government building while a government employee may desirably receive such information. In another example, the roles can accord to a business hierarchy of a company. At a restaurant, a cashier can be associated with a first role, a janitor may be associated with a second role, a manager may be associated with a third role, and an owner may be associated with a fourth role. Users associated with these roles may be desirably provided with information that is dependent upon the roles.

The receiver component 102 is communicatively coupled to a mapping component 104, which can render a customized spatial representation 106 based at least in part upon the received request and the user data. For instance, the representation 106 can be a map, text, audio signals, flashing lights, etc. In more detail, the mapping component 104 can access a data store 108 that retains spatial data 110 which can be spatially indexed (e.g., by latitude/longitude or any other suitable manner). The spatial data 110 can include digital imagery, such as digital photographs of a particular region, wherein such imagery is associated with metadata that indicates its geographic location. Therefore, if the user requests a particular address, for instance, the mapping component 104 can locate spatial data corresponding to the address (or geographic location of the address). The spatial data 110 can additionally include graphical representations of roadways, buildings, text descriptive thereof, and the like. Again, these graphical representations can be associated with metadata that indicates the geographic locations that correspond to the representations.

The mapping component 104 can, for instance, determine a user's role based at least in part upon the user data provided to the receiver component 102. For instance, the user data can include a username and password, and such information can be authenticated by the mapping component 104. The user can be associated with a role, and the mapping component 104 can assign the role based upon the received user name and password. Additionally or alternatively, the user data can include biometric data that can be utilized to identify the user (such as a fingerprint, voice data, etc.). Still further, the user data may include current location of the user, as a user's access privileges to spatial data can alter as their location alters and/or as a location of a region with respect to which a representation is desirably rendered alters. Moreover, the user data can include a unique identification number of a device associated with the user, such as an IMSI number. Similarly, an IP address associated with a device employed by the user can be received by the receiver component 102.

Once the user's role is determined (given their current location, for example), the data store 108 can be accessed to retrieve appropriate spatial data. The spatial data 110 can be organized such that the mapping component 104 can only access a portion of the spatial data 110 based upon the user's role. For instance, various containers of spatial data can be provided, wherein certain containers may be restricted to a user based at least in part upon their determined role. In one example, security personnel of a particular company may have access to map data that indicates location of alarms as well as codes associated with the alarms, while maintenance personnel may only have access to map data that indicates the location of the alarms. Therefore, the alarm codes can reside within a container that is accessible when security personnel requests a map but not when maintenance personnel requests a map.

Additionally or alternatively, the spatial data 110 can be associated with metadata that indicates which roles have access to the data. Thus, each packet of data within the spatial data 110 can be associated with metadata that indicates who can review such data. The mapping component 104 can output the customized representation 106 after analyzing the rights of the user as described in the spatial data 110. Therefore, for instance, a map of a region generated for an individual with a first role can be drastically different from a map of the same region for an individual who is assigned a second role. In yet another example, the mapping component 104 can utilize digital rights management and encryption in connection with selectively providing spatial information to a user. For instance, a user with a particular role can be provided with a specific cryptographic key that decrypts only data that is available to the user. In still another example, digital signature techniques that include a public key/private key pair, sometimes referred to as asymmetric keys, can be used to encrypt and decrypt role-based information. Therefore, for example, an encryption key pair can be assigned to a user or role for digitally signing electronic information, wherein the encryption key pair can include a public key and a private key. Methods for using digital certificates at a client and/or a server are understood by those skilled in the art.

In another example, as alluded to above, user roles can correspond to a portion of a hierarchy. For instance, a cashier attendant may report to a lead cashier who in turn reports to a manager. When the manager provides the receiver component 102 with a request for a spatial representation, the mapping component 104 can provide the manager with spatial data that is a superset of data associated with his/her subordinates. Moreover, through utilization of a graphical user interface, a superior may selectively request spatial data associated with a particular subordinate or subordinates. Therefore, for example, a map provided to the superior will not be congested with information that is not currently of importance to such superior. Moreover, a user's role can be associated with their sensed or input location. For instance, a manager at a particular chain restaurant may not be provided with data associated with a manager when he/she is within a restaurant (of the same chain) that they do not manage. In another example, a regional manager can receive manager data when they are within his/her region, but not receive such data when outside his/her region.

The system 100 can reside upon a client, such as a desktop computer, a smart phone, a cellular phone, a personal digital assistant, a laptop, and/or the like. The system 100 can also be resident upon a server or distributed across servers. Additionally, the system 100 may be distributed between a client and one or more servers. For example, the receiver component 102 can reside upon a client while the mapping component 104, the data store 108, and the mapping data 110 may reside upon a server. It is therefore understood that any suitable configuration of the system 100 is contemplated and intended to fall under the scope of the hereto-appended claims.

Figure 2:
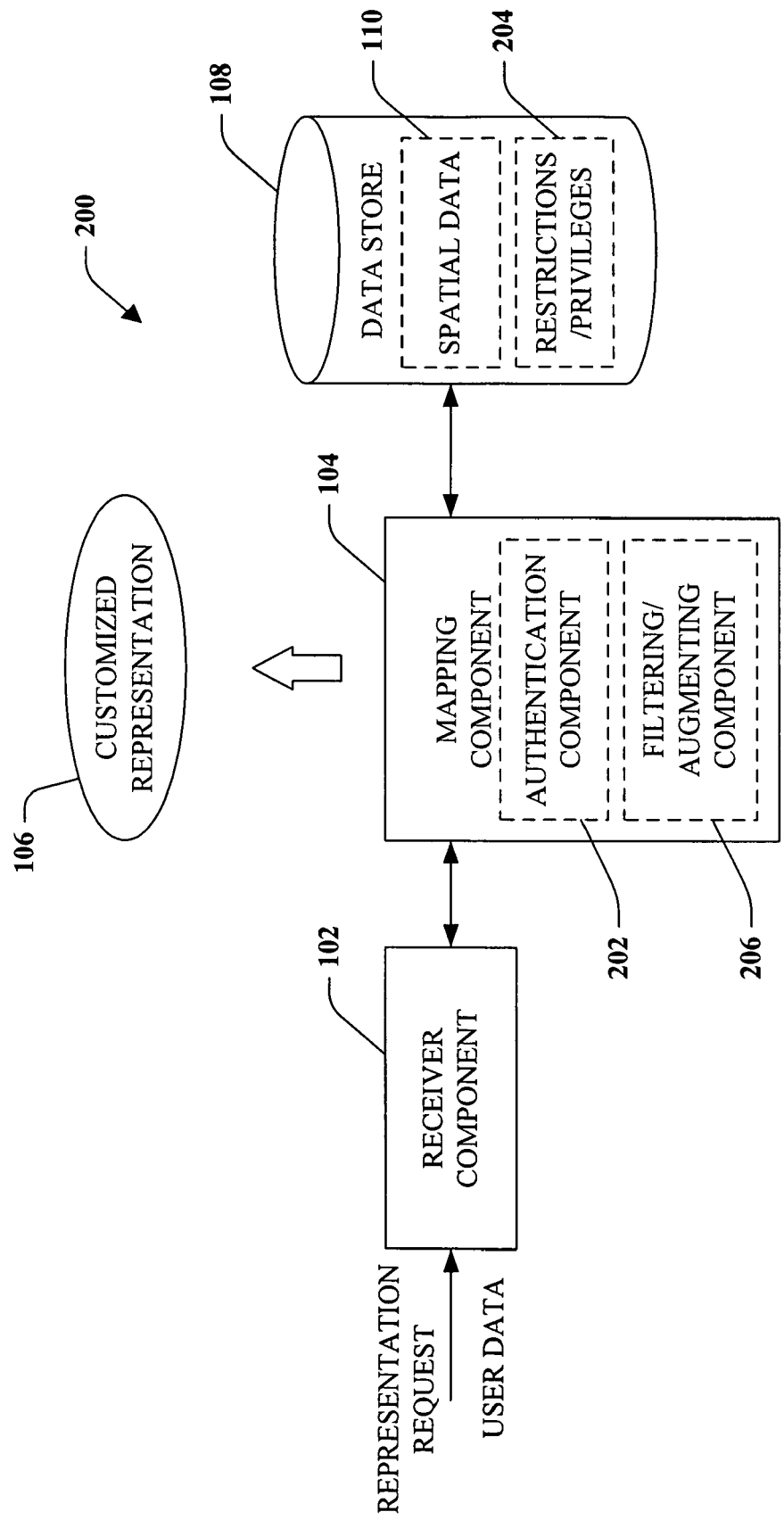
FIG. 2 is a block diagram of a system for determining a user's role in connection with generating a representation of a spatial region.

Now turning to FIG. 2, a system 200 that renders spatial representations based at least in part upon a role assigned to a user is illustrated. The system 200 includes the receiver component 102 that receives a request to render a representation of a particular geographic region and data associated with the user that initiates the request. The request and the user data can be relayed to the mapping component 104, which includes an authentication component 202. The authentication component 202 is configured to analyze the user data and associate the user with a particular role. Pursuant to an example, the user data can include a username and password, and the authentication component 202 can verify that the username and password are registered with the system 200. For instance, a security server, licensing server, or security/licensing component (not shown) can be accessed by the authentication component 202 to ensure that the user initiating the request is registered with the system 200, that the username/password information matches the expectancies of the authentication component 202, and that a license associated with the user authorizes access to requested spatial data. Similarly, the user data can include biometric data, and the authentication component 202 can validate that the biometric data corresponds to an authorized user of the system 200. Still further, the user data can include a user's location when making the request, and the authentication component 202 can verify a level of access that should be associated with the user. If the authentication component 202 cannot validate the data provided by the user, the mapping component 104 can refuse the request and/or provide the user with a map that includes data that is not restricted (e.g., data suitable for the general public). In other words, a public "default" role can be assigned to the user.

Once the user's level of access has been determined by the authentication component 202, the mapping component 104 can access the spatial data 110 within the data store 108. The data store 108 can additionally include restrictions/privileges 204 that are associated with the mapping data 110 depending upon the user's role. As described above, the restrictions/privileges 204 can be implemented by defining containers of data that are associated with certain roles. Additionally or alternatively, the restrictions/privileges 204 can be implemented as metadata that is associated with the mapping data 110, where the metadata indicates viewing rights for particular roles. Still further, the restrictions/privileges 204 can be determined through analysis of a license associated with the user.

The mapping component 104 can additionally include a filtering/augmenting component 206 that ensures that a representation provided to the requesting user includes a correct amount of detail. For instance, if the user is a cashier at a restaurant, a map provided to such user of the restaurant need not display location of each table or a location of a safe. A waiter at the restaurant, however, may be provided with location and identity of tables to aid in determining where to sit customers or who is in need of service. The filtering/augmenting component 206 can filter the spatial data 110 that is not to be provided within the customized representation 106. Moreover, the filtering/augmenting component 206 can augment entities within, for instance a customized map 106 with text that describes the entities. For example, the spatial data 110 can include locations of alarms within a business. The filtering/augmenting component 206, with respect to maintenance personnel, can augment the display of the alarms with text that describes the make and model of the alarms. This enables the maintenance personnel to properly maintain the alarms if one or more of the alarms fail. In a related example, the filtering/augmenting component 206 can augment the display of the alarms with text describing codes that disable the alarms for security personnel. The text appended to the customized representation 106 by the filtering/augmenting component 206 can be within the data store 108 and/or resident upon another storage device that is accessible to the mapping component 104.

Figure 3:
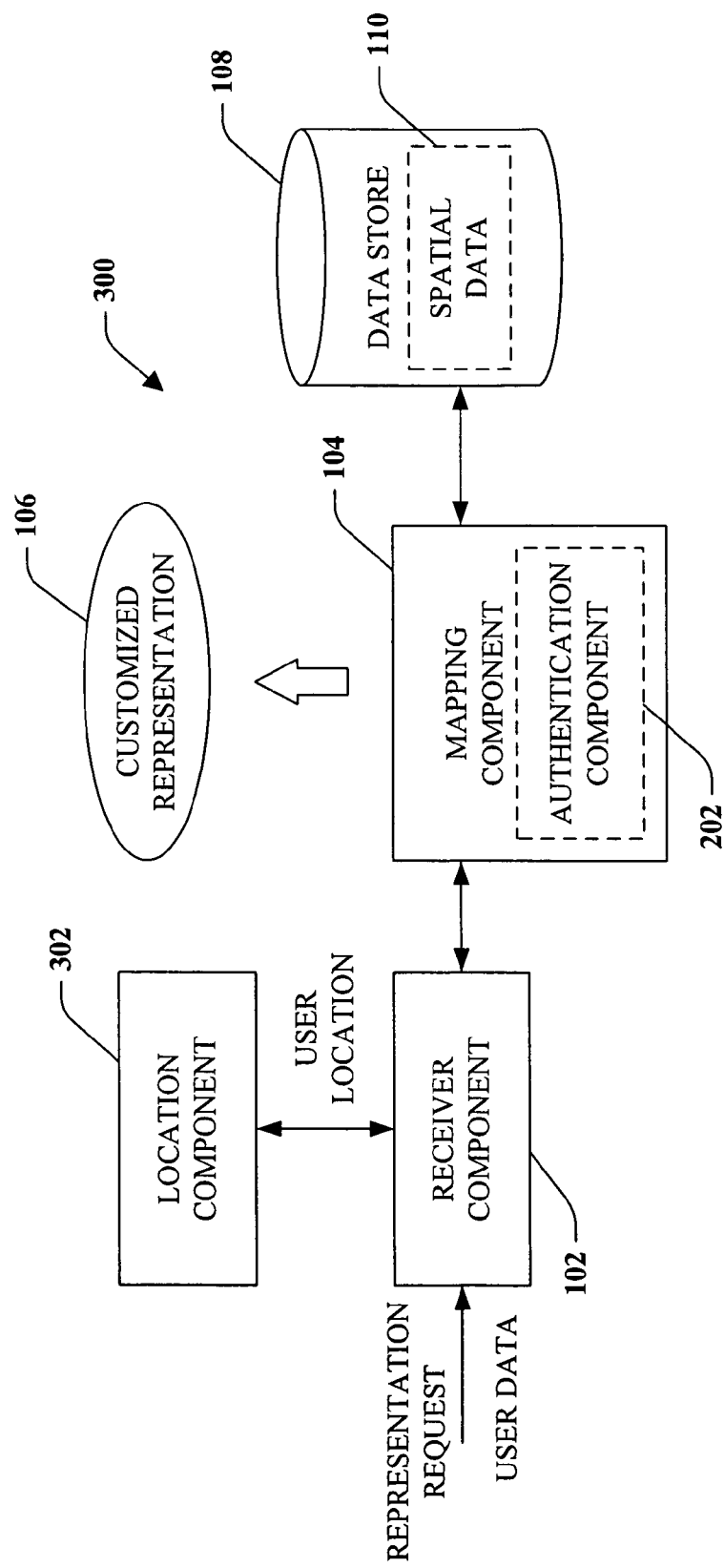
FIG. 3 is a block diagram of a system for creating a customized representation based at least in part upon a user's role and location.

Referring now to FIG. 3, a system 300 that facilitates provision of a representation wherein contents thereof conform to a user's role is illustrated. The system 300 includes the receiver component 102 that receives a request for a representation of a geographic region and further receives data associated with the initiator of the request. The system 300 further includes a location component 302 that determines a location of the user when the user initiates the request. For example, the location component 302 can be resident upon a client (e.g., the location component 302 can be a GPS receiver). Alternatively, the location component 302 can be existent external to the client, such as upon a server. For instance, the user can initiate the request from a cellular telephone. A service provider associated with the telephone can determine a communications tower that is communicatively coupled to the telephone, thereby providing an estimate of the location of the telephone. Similarly, wireless triangulation can be employed to estimate the location of the telephone. Pursuant to another example, the user can employ a PDA to initiate the request, and WiFi signals related to the PDA can be utilized to estimate the location of the PDA.

The request, user data associated with the request (such as username, password, or other data that can identify the user), and the user location can be provided to the mapping component 104. The authentication component 202 can analyze the user data to determine a role of the user. The authentication component 202 can additionally analyze the determined user location and ascertain whether additional rights or limitations are associated with the particular user/role. Pursuant to an example, a manager of a convenience store may have rights to review location of a safe within the store while the manager resides within the store but may not have the same rights when outside the store (or at a great distance from the store). The mapping component 104 can then access the data store 108 in view of the analysis undertaken by the authentication component 202 to generate the customized representation 106. As described above, the data store 108 can include the spatial data 110 as well as data that indicates rights or restrictions associated with the spatial data 110 depending upon the role and/or location of the requesting individual.

Figure 4:
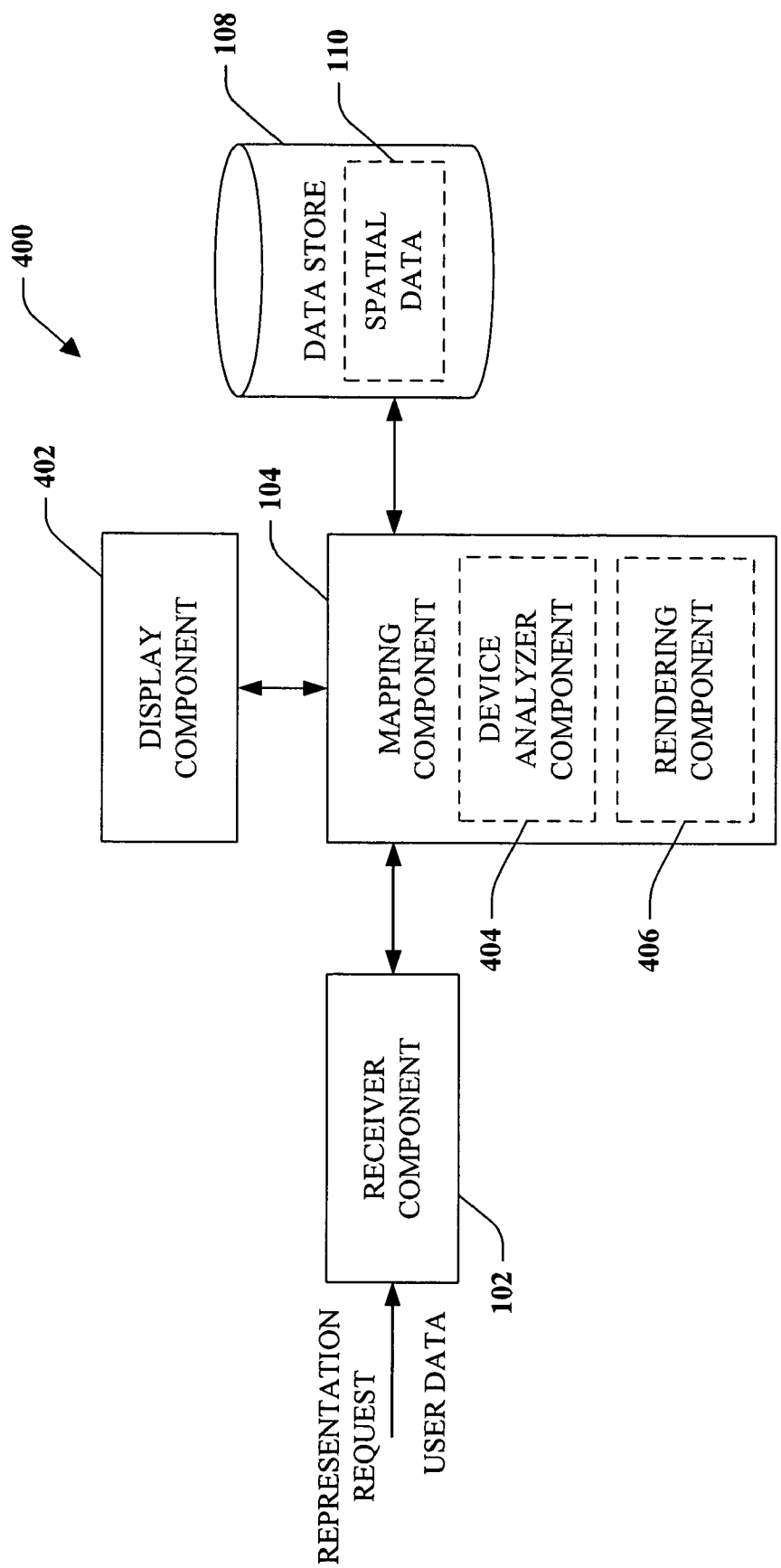
FIG. 4 is a block diagram of a system for providing a representation that is rendered according to display device parameters.

Turning now to FIG. 4, a system 400 that facilitates provision of spatial data to a requesting individual is illustrated. The system 400 includes the receiver component 102 that receives a request for a representation (e.g., a map) of a geographic region from a user. For instance, the request can indicate an address of a building that the user desires to review. Additionally, the request may indicate a latitude and a longitude, a location of a building, or any other manner for referencing a geographic location with respect to which a representation is desirably rendered. The receiver component 102 additionally receives user data, wherein such data can be employed in connection with assigning a role to the initiator of the request.

The request and the user data can be provided to the mapping component 104, which can assign the user with a role based at least in part upon the received user data. The mapping component 104 can then access the spatial data 110 within the data store 108 to retrieve a subset of the spatial data 110 that can be provided to the user. For example, the spatial data 110 can include text that overlays an image, wherein the text is provided due to the user's role (and/or determined location). The mapping component 104 can be directed to render a representation of the requested region to a display device (not shown) that includes a display component 402. For example, the display component 402 can be a graphical user interface, a printer that is to be employed to print out a map, or any other suitable display component.

The mapping component 104 can include a device analyzer component 404 that analyzes the display component 402 in connection with determining how to provide data to the display component 402. For instance, the device analyzer component 404 can determine resolution associated with the display component, display screen size, color capabilities of the display device, etc. Such information can be provided to a rendering component 406 within the mapping component 104 that can render received data to the display component 402 in accordance with parameters determined by the device analyzer component 404. For instance, the rendering component 406 may provide a different display of a map to a portable telephone when compared to a display of the same map to a desktop computer. Further, a grayscale display may not be able to show a same amount of detail as a color display. The rendering component 406 can account for device-specific parameters when determining how to render a requested map to the user.

Figure 5:
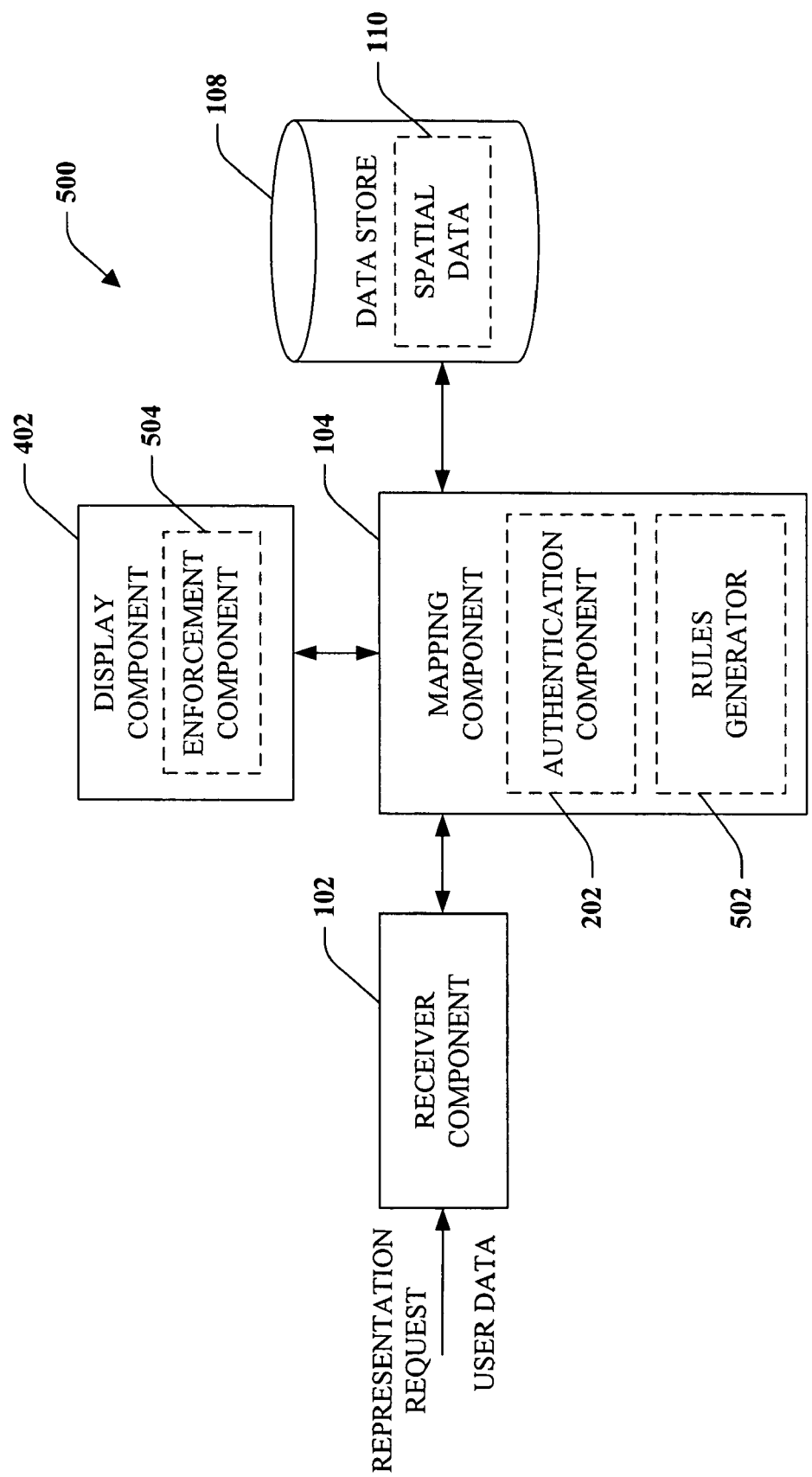
FIG. 5 is a block diagram of a system for creating rules for display times of a customized representation.

Referring now to FIG. 5, a representation system 500 is illustrated. The system 500 includes the receiver component 102, which receives a request for a representation of a certain region and user data from an initiator of the request. The user data can be explicitly provided by the user, such as in the form of a username, password, personal identification number, biometric indicia, and the like. Additionally or alternatively, the user data can be implicitly received, such as an IP address associated with a device, an IMSI number associated with a portable phone, etc. Thus, the user data need not be explicitly provided to the receiver component 102. The mapping component 104 can receive the representation request and the user data and can assign a user a role based at least in part upon the user data (and the request). In more detail, the mapping component 104 can selectively access the spatial data 110 within the data store 108 to render a representation of the requested region, wherein contents of the representation are customized based at least in part upon the role associated with the user.

The mapping component 104 can include the authentication component 202 that verifies user identity and role associated with the user upon receipt of the map request and the user data. For example, the mapping component 104 can exist upon a client, wherein the client is communicatively coupled to a server, such that once the authentication component 202 has authenticated the user, a key can be deployed by a server to the client. The mapping component 104 can include DRM functionality that can restrict access to spatial data based at least in part upon a spatial constraint. In still more detail, the DRM functionality can be employed to enforce DRM licenses issued by the server (not shown). The DRM licenses may include location constraints relating to one or more rights associated with the spatial information. When a user attempts to access spatial information that may be constrained based at least in part upon user location and/or role, the DRM functionality within the mapping component 104 can send a request to the server to verify if the device satisfies a location-constraint with respect to requested spatial information. For instance, the request may contain a public-key certificate associated with the DRM functionality and can be signed with a corresponding private key.

The mapping component 104 can additionally include a rules generator 502 that creates display rules that can be enforced at the display component 402. Pursuant to one example, the rules generator 502 can generate a rule that limits an amount of time that a requested representation (e.g., map) can be displayed upon the display component 402. For instance, it may be undesirable to enable the display component 402 to display a map for an extended amount of time, as the display component 402 may be viewed by one that is not the intended recipient of the map data. Accordingly, for example, the rules generator 502 can create a rule that allows a map to be displayed for a minute prior to requiring additional action from a user (e.g., re-initiating the request, providing the mapping component 104 with a user name and/or password, . . . ). Further, the rules generator 502 can create display rules that relate to a subset of data that can be viewed. Pursuant to an example, the rules generator 502 can place a time limit for displaying particular text, but have no time limit for a remainder of a map provided to the display component 402.

Still further, the rules generator 502 can iteratively reduce an amount of data within a representation over time if a user does not perform re-authentication. For instance, if an individual does not re-authenticate himself/herself within a predefined amount of time, then the user can be provided solely with spatial data that is typically presented to a subordinate of the individual (e.g., less sensitive data). For example, DRM keys may time out and require periodic refreshes of new keys. After a further predefined amount of time has passed without the individual re-authenticating his/her identity, spatial data accessible to the user can be further reduced, such as to show the individual spatial data associated with a subordinate that is lower in a hierarchy or chain of command. If the individual continues to fail to re-authenticate himself/herself, such individual can be provided with a benign display (after passage of a threshold amount of time). While rules created by the rules generator 502 have been described with respect to an amount of time that a map or portions thereof can be displayed, the rules can be based upon location of the individual and other suitable factors.

The display component 402 that is configured to render the representation can include an enforcement component 504 that enforces rules provided by the rule generator 502. For instance, the enforcement component 504 can monitor times that a map is displayed to an individual by way of the display component 402, and can cause the display component 402 to cease displaying a map upon passage of an amount of time dictated by the rules generator 502. Additionally or alternatively, the enforcement component 504 can request information from the user to ensure that a device has not changed hands (e.g., username and password). Still further, the enforcement component 504 can monitor location of a device (not shown) that includes the display component 402 and can cause display of a map to be altered as the device's location changes (as prescribed by rules output by the rules generator 502).

Figure 6:
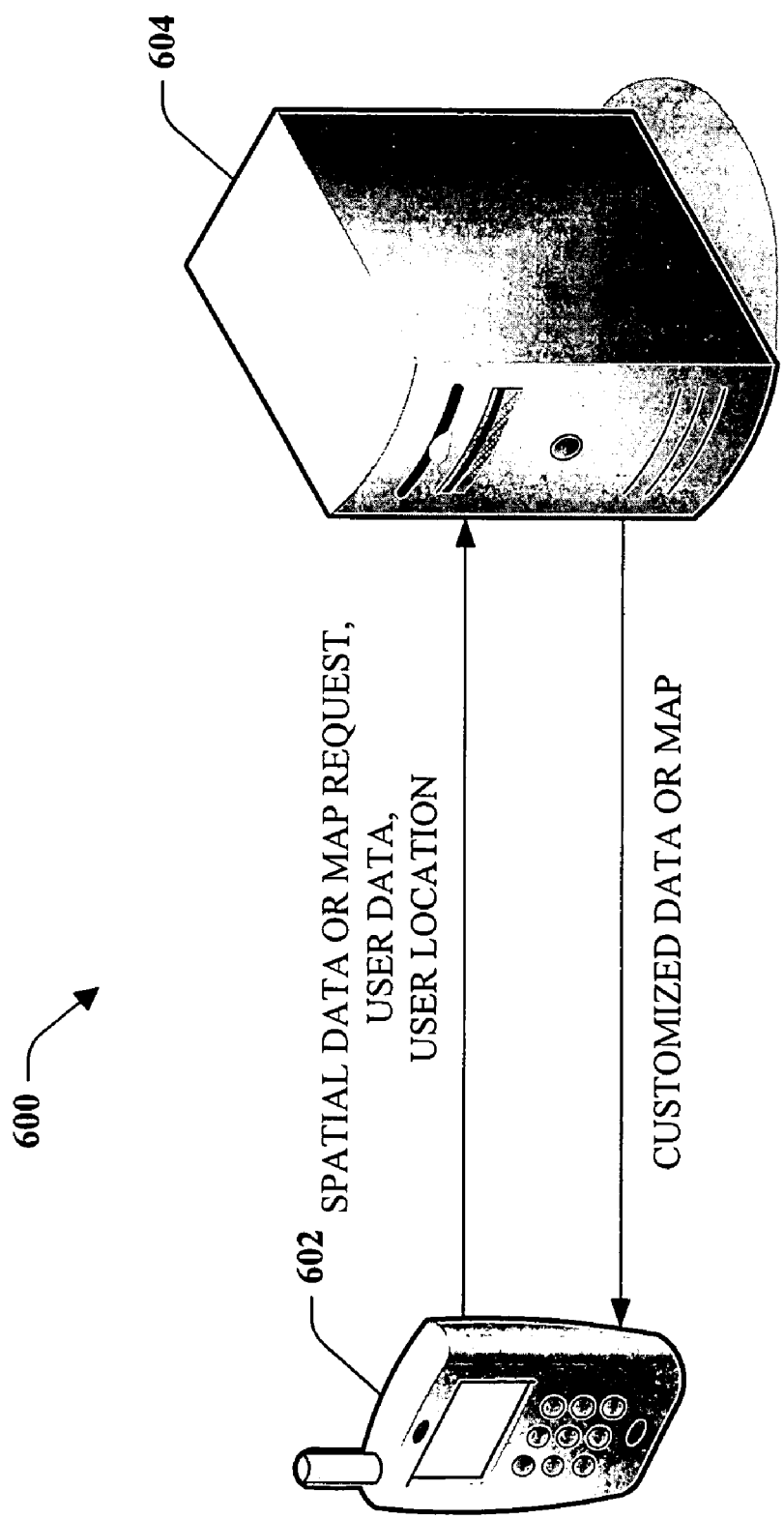
FIG. 6 is an example illustration of a portable device and server interacting in connection with rendering a representation to a user.

Turning now to FIG. 6, an example implementation 600 of a representation (e.g., map) generation and provision system is illustrated. A portable device 602 is utilized to generate a request for spatial data (which can include a map), wherein the request includes a geographic location with respect to which a representation is to be generated. The portable device 602 can also be provided with user data by the user of the portable device, wherein the user data can include a username and a password, a personal identification number, and/or the like. Data relating to the representation request can then be provided to a server 604. The server 604 can be associated with an intranet, the Internet, a wireless network, or any other suitable network. The server 604 can additionally include license information associated with the user. The user data can also be provided to the server 604, wherein the user data can also include a unique identification number associated with the mobile device 602 (e.g., an IMSI number), a network address related to the portable device 602, and other suitable information. Still further, the portable device 602 can provide the server 604 with location information, wherein the location information can be determined from within the portable device 602 (e.g., a GPS receiver), determined from a network, etc.

The representation request, the user data, and the user location can be provided to the server 604, which can include spatial data that may be organized according to the user's role. In more detail, the server 604 can receive the user data and the user location and assign a role to the user based upon such data. The role can correspond to an individual's position within a business or government hierarchy. The server 604 can include a mapping application that accesses spatially referenced data within the server 604 (or at an accessible location). The mapping application can then generate a customized representation, such as a map, wherein contents of the representation accord to the role determined by the server

604. The customized representation can then be relayed from the server 604 to the mobile device 602 for display.

Figure 7:
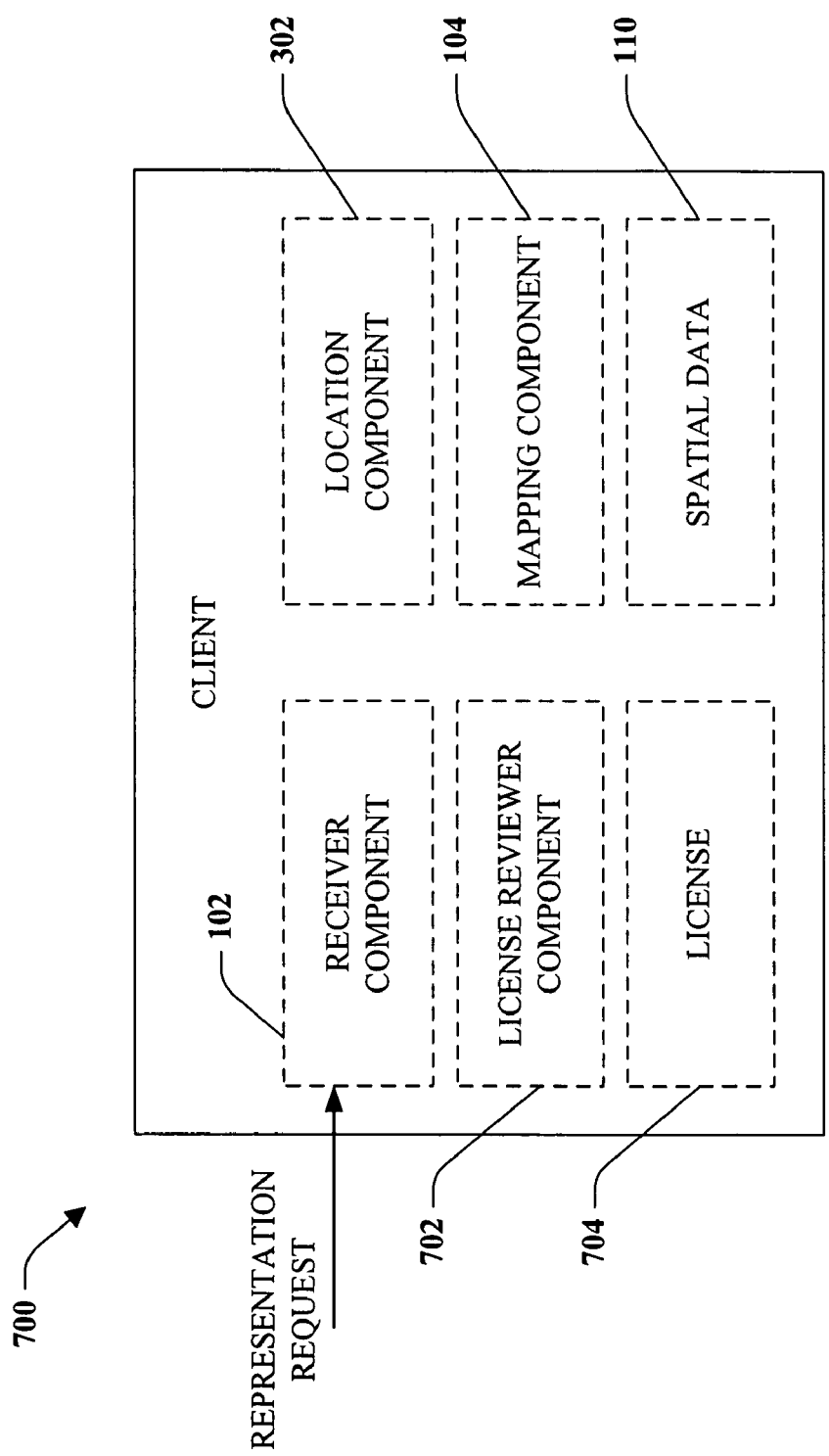
FIG. 7 is a block diagram of a client that can be employed to generate a customized representation according to a user's role.

Now referring to FIG. 7, a client device 700 that can perform rendering of a spatial representation is illustrated. The client device 700 includes the receiver component 102 that receives the representation request and user data. The receiver component provides the representation request and the user data to a license reviewer component 702, which accesses a license 704 that is associated with the client device 700 and/or a user thereof. The license 704 can specify which mapping data the user has access to at particular times and/or locations. For instance, the license 704 can dictate that the user is not allowed to access certain data when they are not within a threshold distance from a particular geographic location. The location can be determined by the location component 302, which can be a GPS receiver or other suitable sensor. In another example, the location component 302 can receive a location of the client device 700 from an external entity, such as one associated with a wireless network. For instance, the external entity (not shown) can perform triangulation with respect to the client 700, can monitor a wireless tower communicating with the client 700, or other manner for estimating location of the client 700. The location component 302 can provide the location information to the license reviewer component 702. The mapping component 104 can then access the spatial data 110 and render a representation that conforms to the license 704. Thus, a client device 700 can render a spatial representation that is customized according to user role or location.

Figure 8:
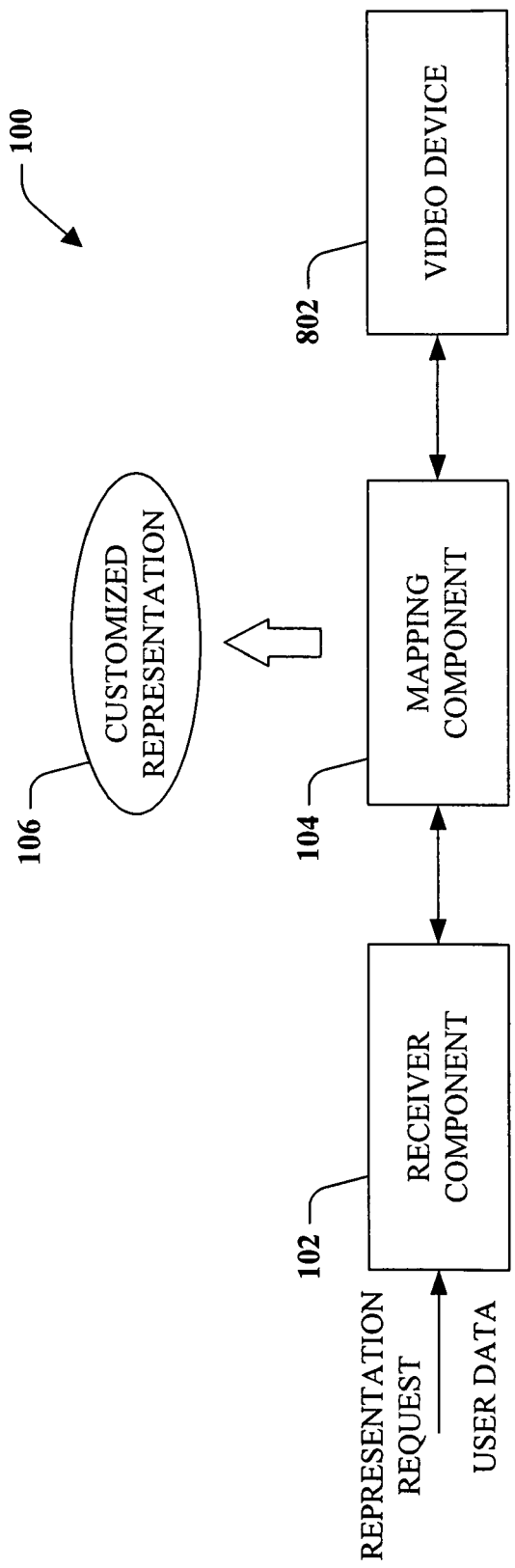
FIG. 8 is a block diagram of a system for customizing real-time video of a spatial region.

Turning now to FIG. 8, a system 800 that facilitates provision of a spatial representation that is customized according to user role is illustrated. The system includes the receiver component 102 that receives a request for a representation (e.g., a map) of a certain geographic location and user data. The mapping component 104 can then access a video device 802 that is creating real-time video of the aforementioned geographic region. For instance, the video device 802 can output video data that is geo-referenced. The mapping component 104 can analyze the request and the user data to determine a role of the user, and the role can in turn be employed to determine a manner of displaying real-time video associated with the requested location. For instance, certain portions of the video can be grayed out depending upon the role. The mapping component 104 can include a rendering component (not shown) that renders video data in a manner customized according to the user role. The system 800 is thus intended to illustrate that the claimed subject matter is not limited to still images, but streaming geo-referenced video can be also be customized according to user roles.

Referring now to FIGS. 9-12, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
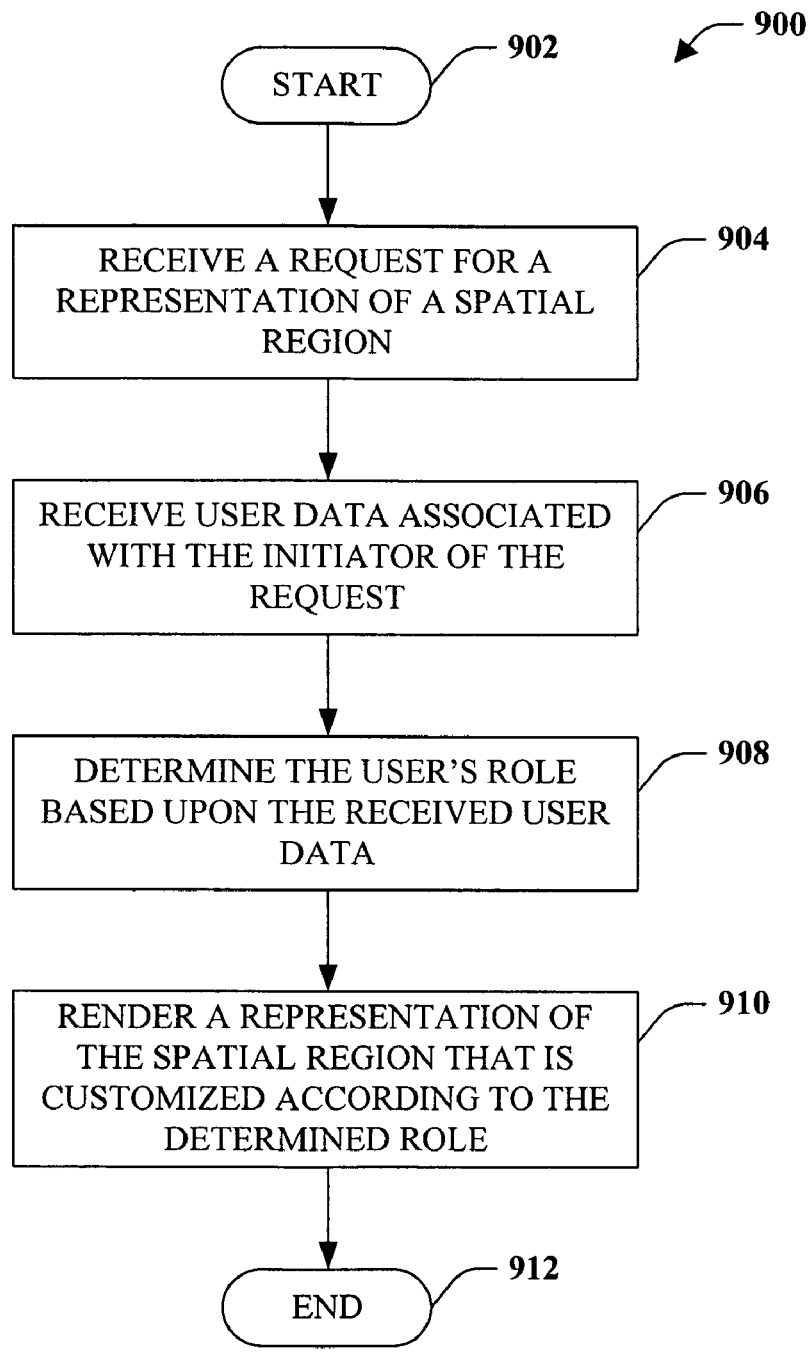
FIG. 9 is a representative flow diagram of a methodology for creating a representation of a spatial region based at least in part upon a user's role.

Referring specifically to FIG. 9, a methodology 900 for creating a spatial representation that is customized according to a user's role is illustrated. The methodology 900 starts at 902, and at 904 a request for a representation of a geographic region is received, where the region can be an address, a city, a building, a monument, or any other suitable geographic location, and the representation can be a map, a map with text, text alone, and the like. The request can be received at a client device, over a network such as the Internet, etc. At 906, user data with respect to the request for the representation is received. The user data can include usernames, passwords, personal identification numbers, biometric indicia, IP addresses, unique identifiers for a device, or any other suitable user-related information. At 908, the user's role is determined by analyzing the received user data. For example, the user can be registered with a system and can be indexed to a particular role, so that when the user is authenticated the role is determined. Authentication can be undertaken through any suitable security methods, such as matching a provided username and password with a username and password stored within a security server. At 910, a customized representation of the requested geographic region is provided to the user based at least in part upon the determined role. The methodology 900 then completes at 912.

Figure 10:
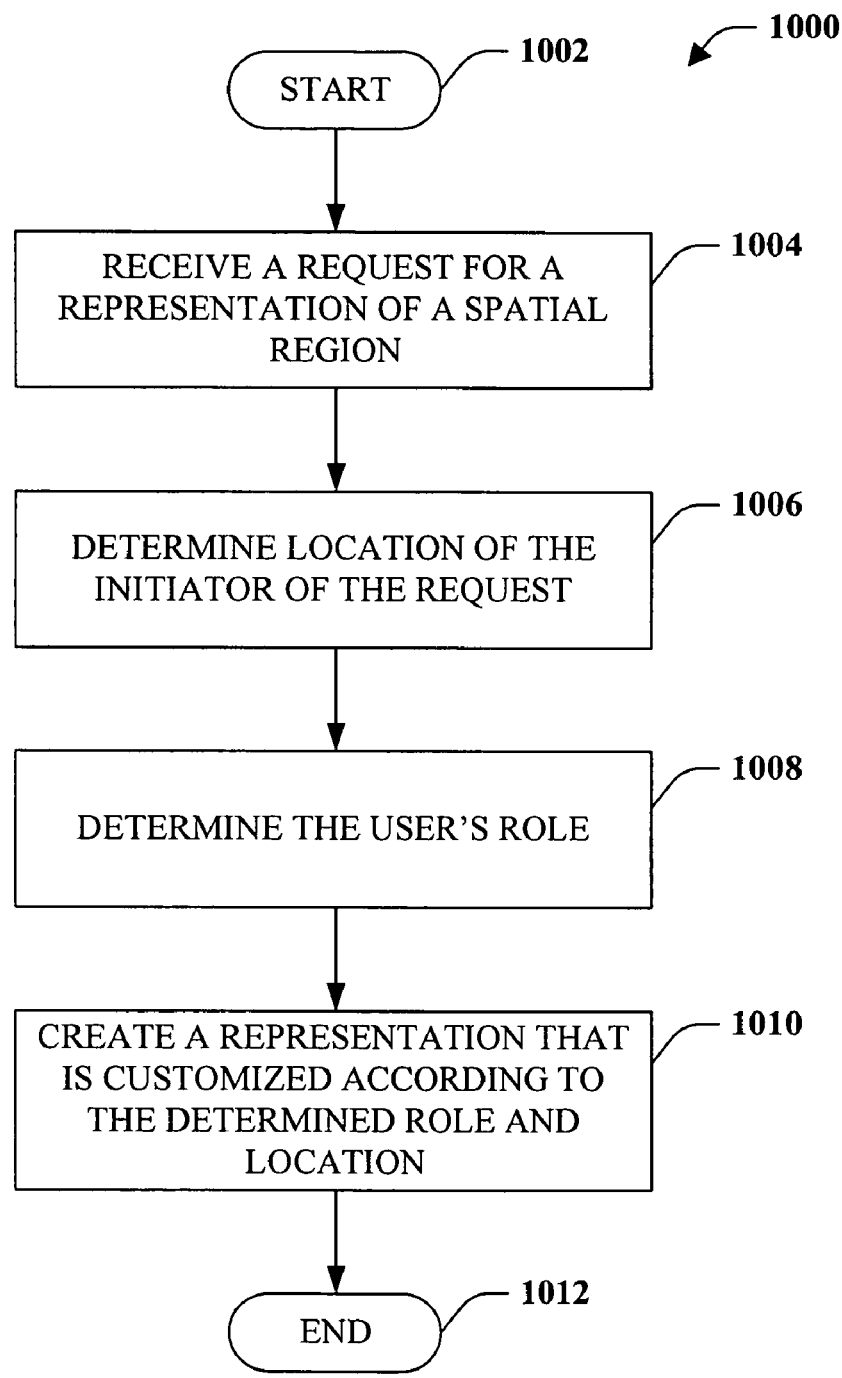
FIG. 10 is a representative flow diagram of a methodology for creating a representation of a spatial region based at least in part upon a user's role and location.

Now turning to FIG. 10, a methodology 1000 for creating a customized representation of a particular geographic region is illustrated. The methodology 1000 starts at 1002, and at 1004 a request for a representation of a geographic region is received. The request can be provided through voice commands, keystrokes, depressing portions of a pressure-sensitive screen, etc. At 1006, a location of the initiator of the request is determined. As described above, a GPS receiver associated with the device utilized to initiate the request can be employed to determine location of the initiator of the request. In other examples, monitoring WiFi signals, cellular towers communicating with a device, monitoring IP addresses, and the like can be employed to estimate location of the initiator of the request. At 1008, the user's role is determined. Determination of the user's role has been described in detail above. At 1010, a representation of the geographic region that was the subject of the request is provided to the user, wherein contents of the representation are customized according to the determined role and the determined location. In one example, a bank manager may have access to map data indicating location of safes, combinations of safes, and the like while the bank manager is located within a certain proximity of the bank. However, while at home, it may not be desirable to provide the bank manager with such information. Accordingly, the output map can be created based both upon the bank manager's role and location at the time of the request.

Other scenarios are also contemplated by the inventors and are intended to fall under the scope of the hereto-appended claims. For instance, real-time flight information may be provided to airline personnel and/or military personnel but not to the general public. Similarly, maintenance blueprints associated with a building, an infrastructure associated with a building, and the like may be restricted based upon role. In yet another example, emergency personnel can be provided a globally assigned role in an emergency, such that emergency personnel can access critical information during the course of the emergency. Other examples will be readily discernable by those skilled in the art. The methodology 1000 then completes at 1012.

Figure 11:
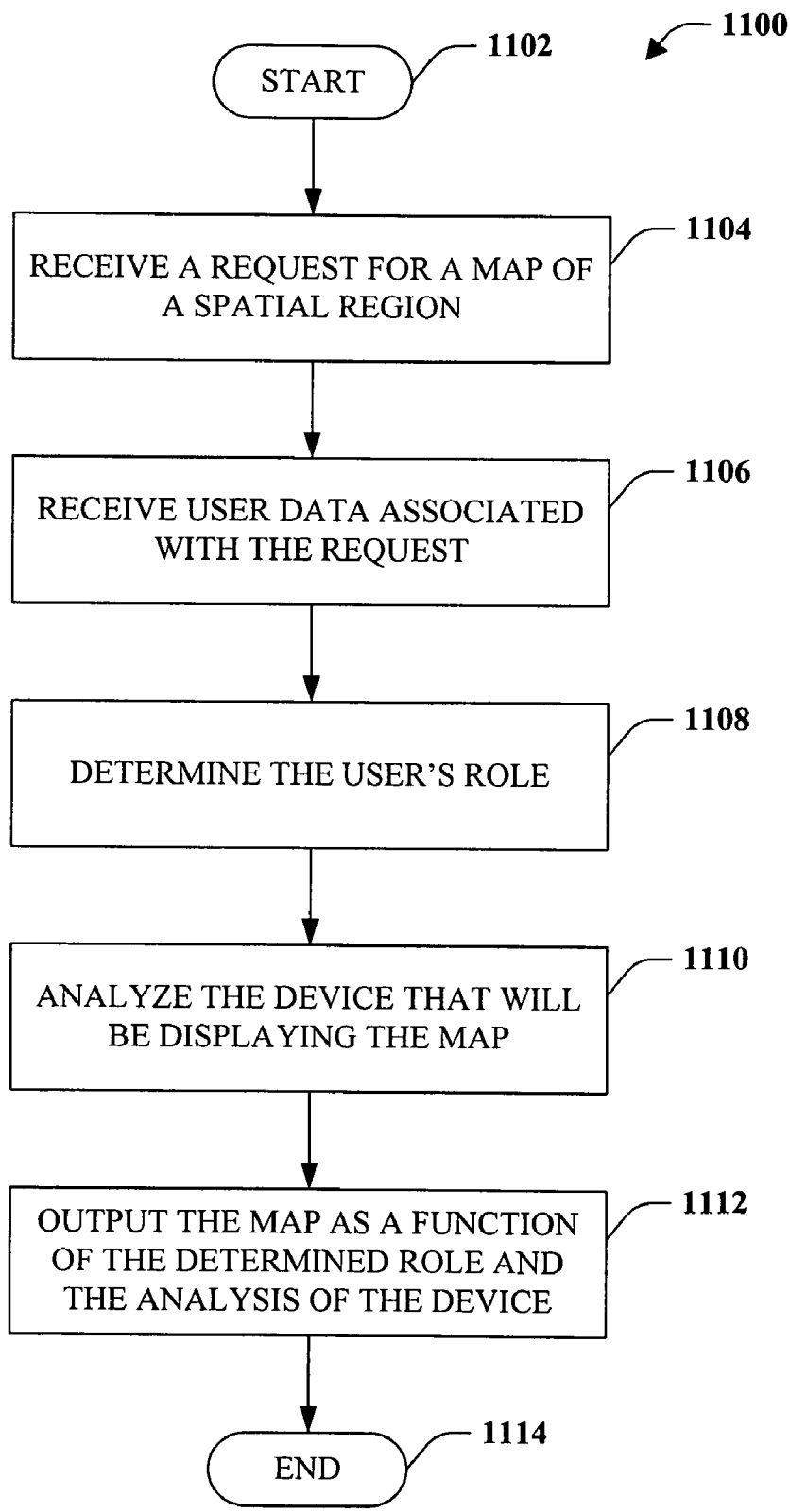
FIG. 11 is a representative flow diagram of a methodology for providing a map to a device based at least in part upon an analysis of the device.

Referring to FIG. 11, a methodology 1100 for providing a customized map to a user is illustrated. The methodology 1100 starts at 1102, and at 1104 a request for a map of a particular spatial region is received. At 1106, user data associated with the request is received, and at 1108 the user's role is determined based at least in part upon the received user data. At 1110, the device that will be displaying the map is analyzed. For instance, processing capabilities, screen size and resolution, color capabilities, and the like can be analyzed. At 1112, the map is output as a function of the analysis and the user's determined role. For example, a map of a region would be displayed differently when comparing a portable device and a desktop computer. The methodology 1100 then completes at 1114.

Figure 12:
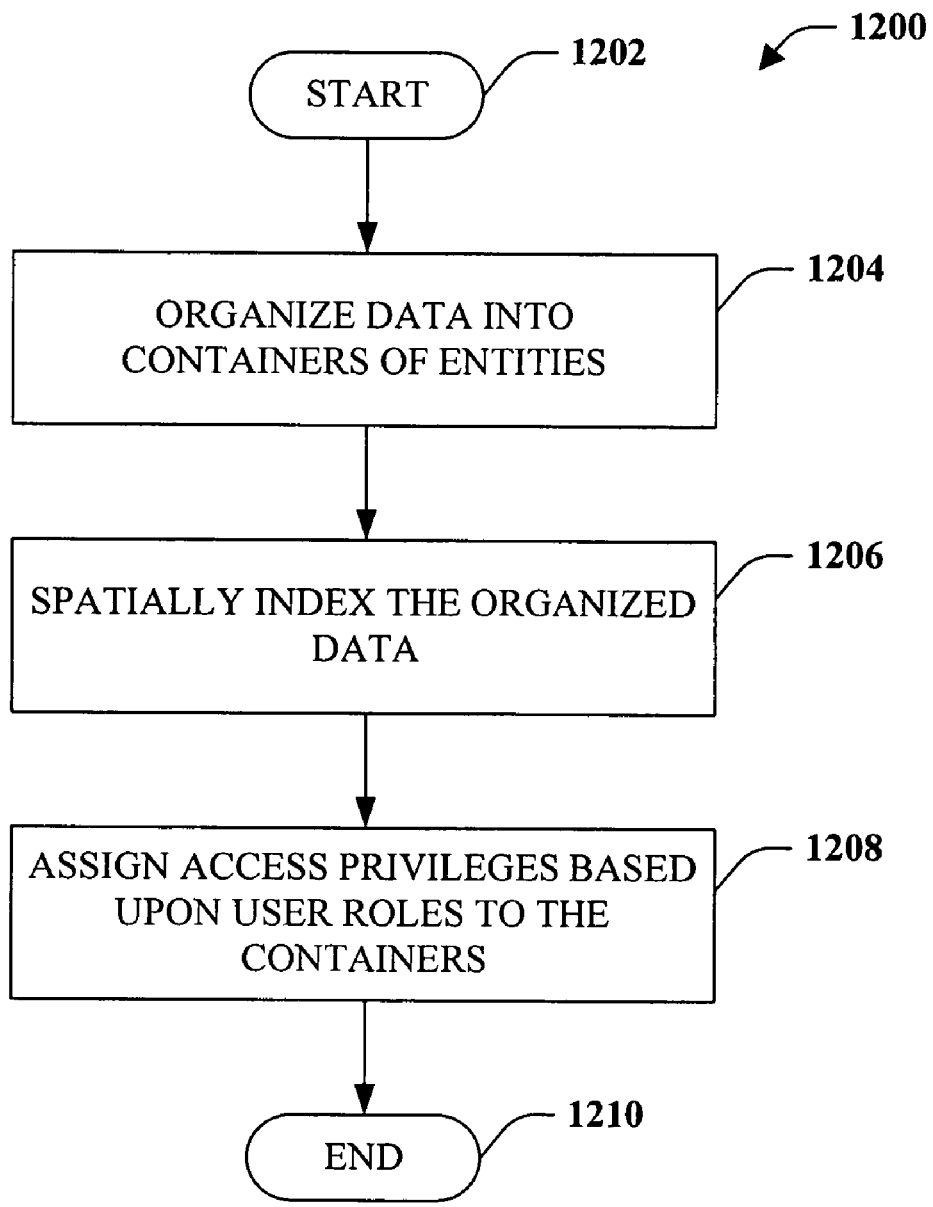
FIG. 12 is a representative flow diagram of a methodology for assigning access privileges to data that is utilized to create a representation of a spatial region.

Turning now to FIG. 12, a methodology 1200 for organizing visual data to enable provision of customized maps is illustrated. The methodology 1200 starts at 1202, and at 1204 visual data is organized into particular containers. For instance, a container can be utilized to include visual depictions of roads and text associated therewith. Another container can be of rooftops of houses. Thus any number of containers can be defined. Furthermore, containers can be subordinate to other containers, such that a hierarchy of containers is created. At 1206, data within the container is spatially indexed, thereby enabling creation of a map. For example, a road in a first container can be indexed to a house in another container. Moreover, data within the containers can be indexed according to latitude/longitude. At 1208, rights are assigned to the containers of data according to different roles. Thus, a first user may have access to data pertaining to roads within a certain geographic region while a second user may not have access to the roads within the geographic region. The methodology 1200 then completes at 1210.

Figure 13:
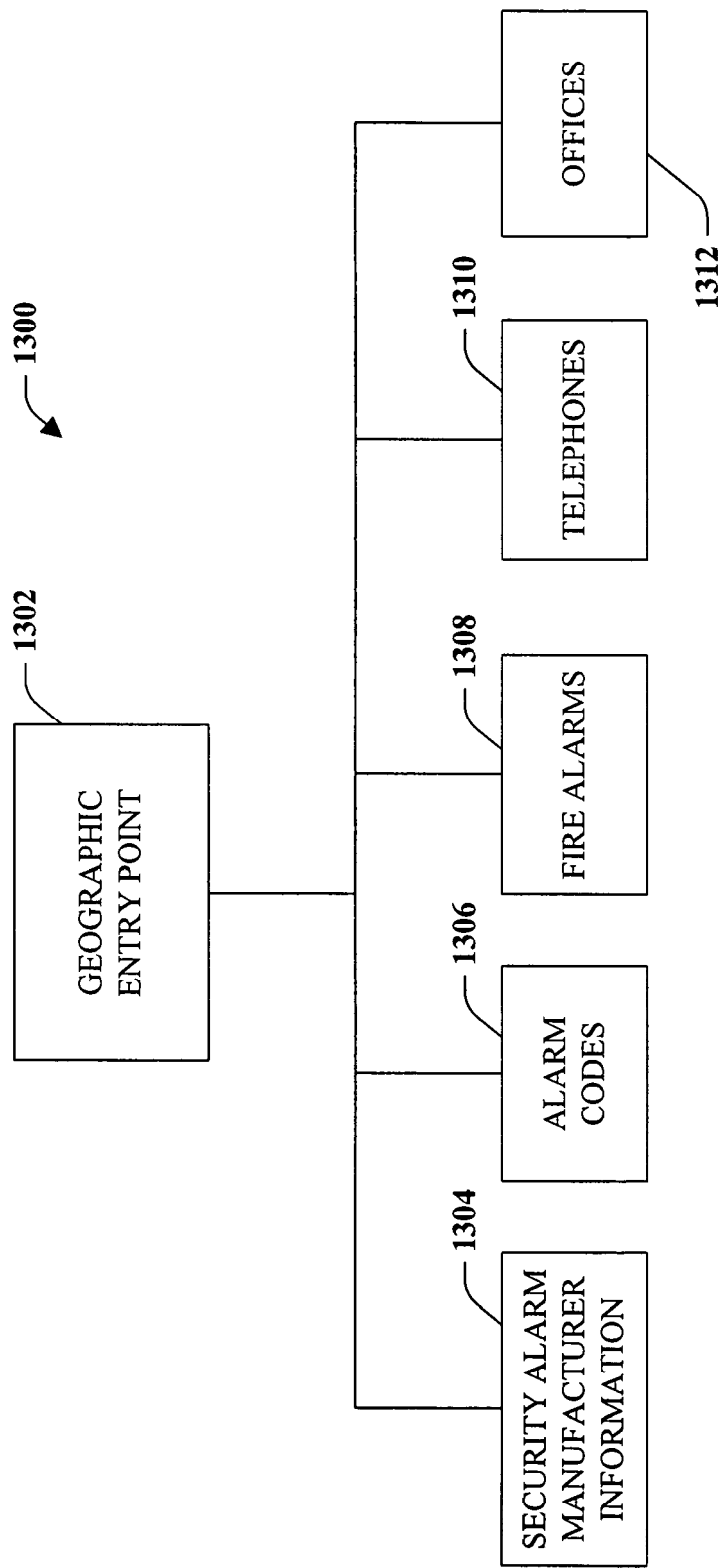
FIG. 13 illustrates example containers of data utilized to create a representation of a spatial region.

Turning now to FIG. 13, an exemplary plurality of containers 1300 is illustrated. Use of the containers can be initiated given a geographic entry point 1302. Once such point 1302 is provided, the containers can be created through analyzing metadata that indexes such data geographically and categorizes the data. In this example, the geographic entry point 1302 can be with respect to an office building. An office building can include safes, security alarms, telephones, fire alarms, several offices, etc. Accordingly, data can be arranged in containers, wherein a container 1304 can include information relating to manufacturers of security alarms, a container 1306 can include codes for the alarms, a container 1308 can include visual data of a fire alarm, a container 1310 can include visual data relating to safes within the office building, and a container 1312 can include information relating to locations of offices within the office building. Access rights/restrictions can be defined for each of the containers for various roles. Pursuant to an example, security personnel may have access to safety alarm codes but not manufacturer information, while maintenance personnel may have access to manufacturer information but not alarm codes. Thus, layers of data can be provided to a user based upon their determined role.

Figure 14:
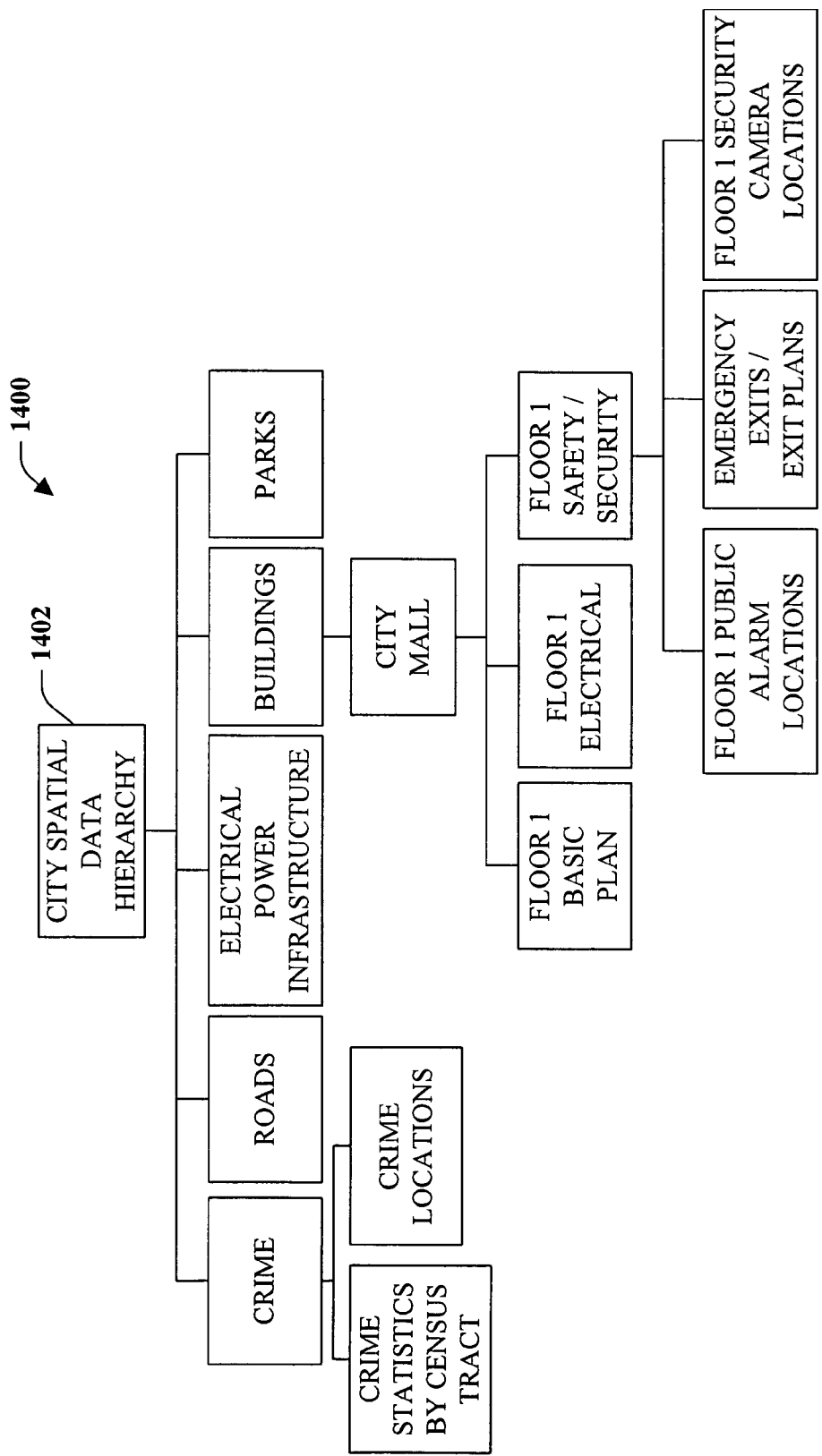
FIG. 14 illustrates example containers of data utilized to create a representation of a spatial region.

Referring now to FIG. 14, another example hierarchical structure of containers 1400 is provided, wherein content of some containers may be restricted based upon role while others are unrestricted. A container 1402 can be an entry point into containers relating to a city, wherein such entry point is unrestricted. Subordinate branches of the hierarchy may be associated with restriction, however, as such information may desirably be withheld from the general public. For instance, containers that include data relating to location of crime, electrical power infrastructure of the city, electrical schematics of a city mall, location of security cameras associated with a particular floor of the city mall, and other containers may include restricted data (e.g., data that is restricted to authorized users). Remaining containers may not be associated with restriction, such that members of the general public can have access to such data.

Figure 15:
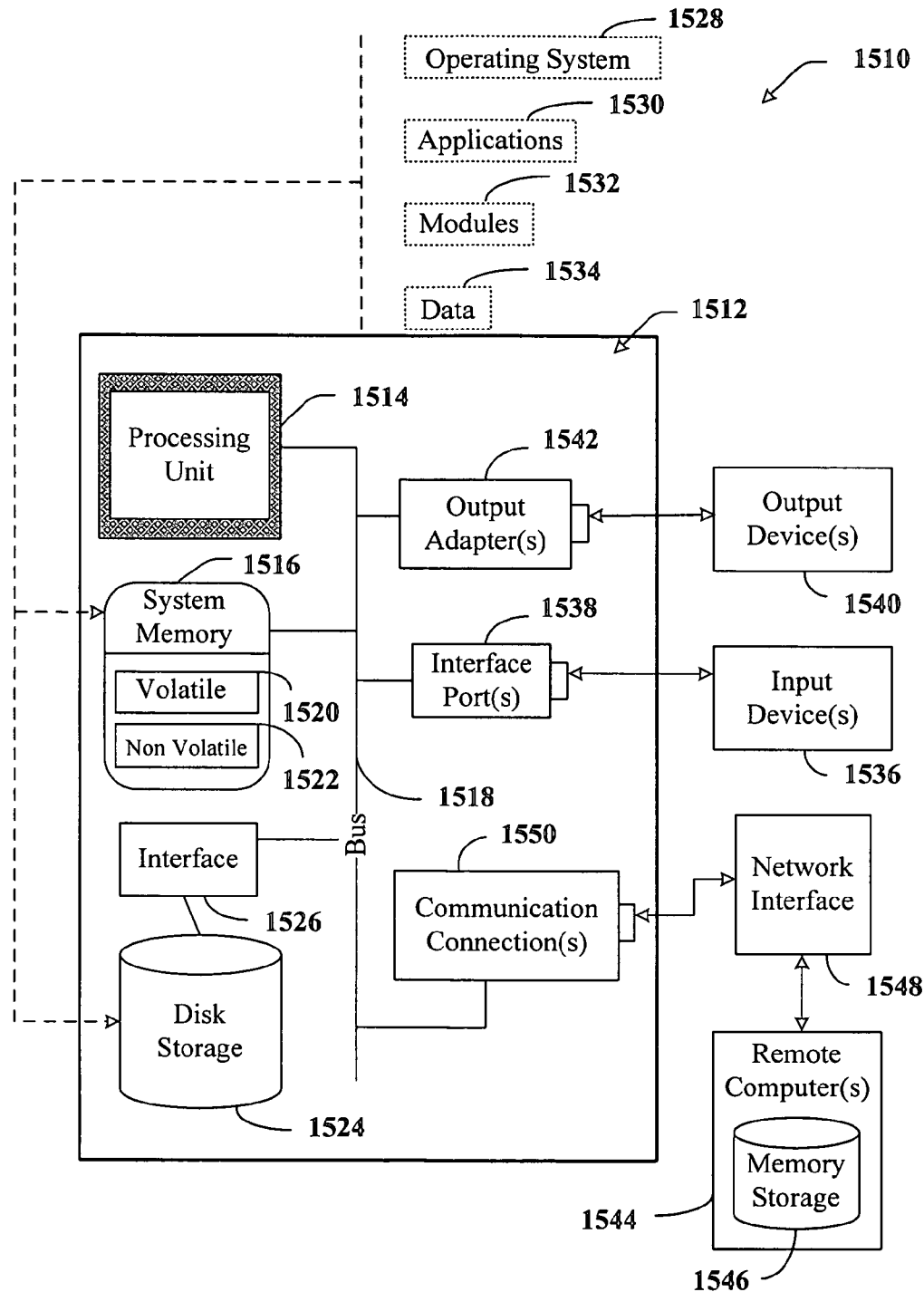
FIG. 15 is a schematic block diagram illustrating a suitable operating environment.

In order to provide additional context for various aspects of the claimed subject matter, FIG. 15 and the following discussion are intended to provide a brief, general description of a suitable operating environment 1510 in which various aspects may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the features described herein. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 that can be employed in connection with outputting maps that are customized according to a user's role includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the subject invention can be implemented with various operating systems or combinations of operating systems.

The computing environment 1510 can additionally include a DRM blackbox component (not shown), which can be utilized in connection with restricting access to spatial data based at least in part upon location constraints, wherein location constraints can include current location of a user together with location associated with a representation request. The DRM blackbox can be configured to enforce DRM licenses issued by a license server. The blackbox is configured to perform many different operations including examining licenses associated with spatial data and a particular user and examining location constraints within the license. The DRM blackbox can also be configured to communicate with license servers regarding activating, licensing, obtaining spatial data, and determining a device's location. The DRM blackbox may communicate using any one of several client-server protocols.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, remote control, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

Figure 16:
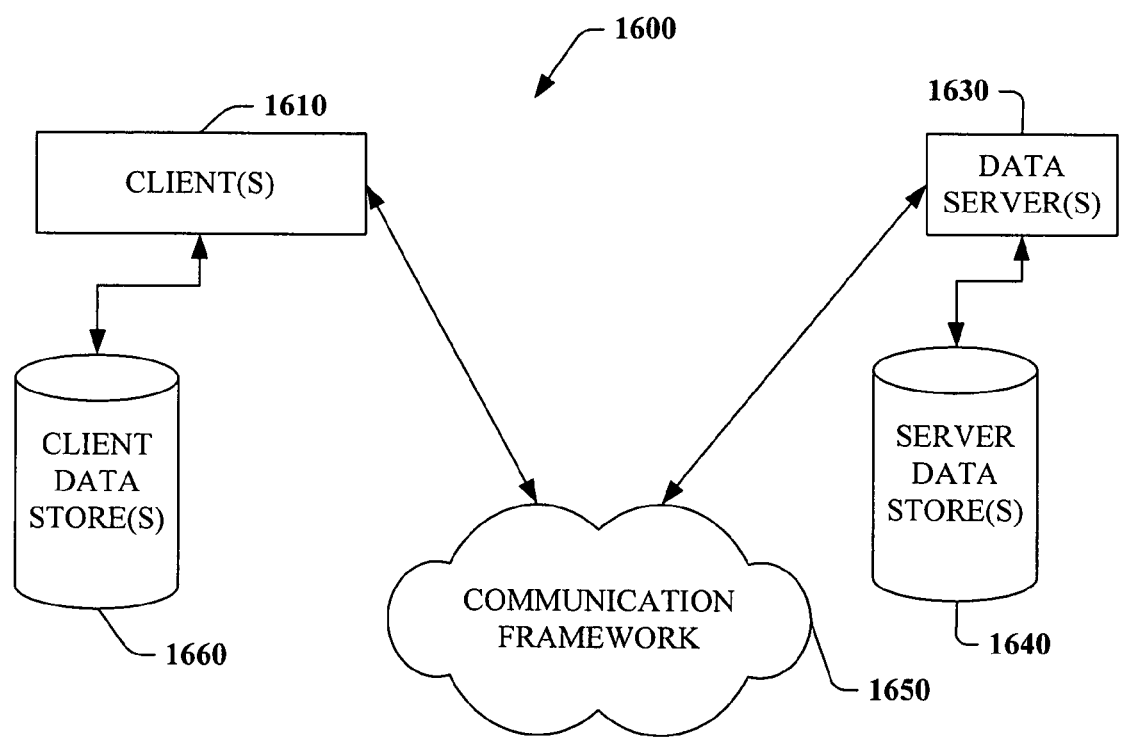
FIG. 16 is a schematic block diagram of a sample-computing environment.

FIG. 16 is a schematic block diagram of a sample-computing environment 1600 with which the claimed subject matter can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing the claimed subject matter, for example. In one example, one or more of the servers 1630 can be a DRM license server. A DRM blackbox (not shown) can access the DRM license server through a communication framework 1650 to update and/or retrieve license information relating to spatial data. One possible communication between a client 1610 and a server 1630 can be in the form of a data packet adapted to be transmitted between two or more computer processes. The system 1600 includes the communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the server(s) 1630. In one particular example, the server(s) can include a mapping application that is accessible to a client by way of a network. Users can request a representation from a mapping application by submitting a request to the mapping application within the server by way of the client and the network, and the mapping application can then output a customized representation (according to a user's role) to the client.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A spatial-data handling and map-generation system comprising the following computer-executable components:
   a receiver component that receives both a request for information associated with a geographic region and data associated with an initiator of the request;
   a spatial-data datastore that stores alternative versions of the information associated with the geographic region, wherein an unsecured alternative version is indexed in the spatial-data datastore to be accessible to initiators having a first role, and
   wherein a secured alternative version is indexed in the spatial-data datastore to be accessible to initiators having a second role; and
   a mapping component that, upon assignment of the first role to the initiator based on the data associated with the initiator, retrieves from the spatial-data datastore the unsecured alternative version, wherein the mapping component renders the unsecured alternative version to the initiator.

2. The system of claim 1, further comprising an authentication component that analyzes the received data to verify that the initiator of the request is authorized to view a subset of the spatial data.

3. The system of claim 1, further comprising a filtering component that selectively filters data from the spatial data based at least in part upon the assigned role.

4. The system of claim 1, further comprising an augmenting component that augments the spatial data with descriptive text based at least in part upon the assigned role.

5. The system of claim 1, further comprising a location component that determines a location of the initiator of the request, the mapping component customizes the representation based at least in part upon the determined location.

6. The system of claim 1, the representation is one or more of a map, textual data, and audible data.

7. The system of claim 1, the mapping component analyzes a private key prior to rendering the representation.

8. The system of claim 1, further comprising a rules generator that creates rules relating to an amount of time the representation can be rendered without user action.

9. The system of claim 1, further comprising a license reviewer component that analyzes a license associated with spatial data that is accessed to create the representation, the mapping component renders the representation based at least in part upon the analysis.

10. The system of claim 1, spatial data utilized by the mapping component to render the representation is organized through use of a plurality of containers.

11. The system of claim 1, a server comprises the mapping component.

12. The system of claim 1, a client comprises the mapping component.

13. One or more computer storage media having stored thereon computer-executable instructions that, when executed, cause a computing device to perform a method of outputting data representative of a spatial region, the method comprising:
   receiving from a mobile device a request for information relating to the spatial region;
   determining that a physical location at which the mobile device is positioned is approved;
   retrieving from a spatial-data datastore sensitive information, which is approved to be rendered to the mobile device when the physical location is approved, wherein when the physical location is not approved the sensitive information is not approved to be rendered to the mobile device; and
   rendering the sensitive information to the mobile device.

14. The computer storage media of claim 13, further comprising:
   receiving user data; and
   determining a role of the user based at least in part upon the received user data.

15. The computer storage media of claim 14, wherein the user data includes one or more of a username, a password, a personal identification number, a unique identification number of a device utilized to initiate the request, and an IP address associated with the device.

16. The computer storage media of claim 13, further comprising:
   analyzing capabilities of the mobile device that is to display the map; and
   rendering the map based at least in part upon the capabilities.

17. The computer storage media of claim 13, further comprising applying digital rights management by using a private key/public key pair in connection with rendering the representation.

18. One or more computer storage media having stored thereon computer-executable instructions that, when executed, cause a computing device to perform a method of outputting a representation of a spatial region, the method comprising:
   receiving a request to send the representation of the spatial region;
   determining an authorization level of a user that initiated the request;
   retrieving from a spatial-data datastore an approved representation of the spatial region that is approved to be rendered to users having the authorization level and that includes both sensitive data and nonsensitive data;
   rendering the approved representation of the spatial region having both the sensitive data and the nonsensitive data; and
   after passage of a threshold duration of time, causing the sensitive data to be removed from presentation and allowing the nonsenstive data to remain rendered.

* * * * *